(12) United States Patent
Sato et al.

(10) Patent No.: US 7,237,804 B2
(45) Date of Patent: Jul. 3, 2007

(54) VEHICLE TILT TYPE STEERING DEVICE

(75) Inventors: Kenji Sato, Gunma-ken (JP); Yasuhiro Shibuya, Gunma-ken (JP)

(73) Assignee: NSK Ltd., Tokyo (JP)

( * ) Notice: Subject to any disclaimer, the term of this patent is extended or adjusted under 35 U.S.C. 154(b) by 279 days.

(21) Appl. No.: 10/469,051

(22) PCT Filed: Dec. 25, 2002

(86) PCT No.: PCT/JP02/13508

§ 371 (c)(1),
(2), (4) Date: Aug. 26, 2003

(87) PCT Pub. No.: WO03/055731

PCT Pub. Date: Jul. 10, 2003

(65) Prior Publication Data

US 2004/0245758 A1    Dec. 9, 2004

(30) Foreign Application Priority Data

Dec. 27, 2001  (JP)  ............................. 2001-398485
Oct. 25, 2002  (JP)  ............................. 2002-311522

(51) Int. Cl.
*B62D 1/18*   (2006.01)
(52) U.S. Cl. .................................................. 280/775
(58) Field of Classification Search ................ 280/775, 280/774; 74/493; 464/140, 162
See application file for complete search history.

(56) References Cited

U.S. PATENT DOCUMENTS 4,878,394 A * 11/1989 Nakamura et al. ............. 74/493
4,934,737 A    6/1990 Nakatsuka ................... 380/775
5,048,364 A * 9/1991 Minamoto et al. ............ 74/493
6,282,977 B1   9/2001 Satoh et al. .................. 74/493

FOREIGN PATENT DOCUMENTS

| JP | 60-157962 | 8/1985 |
| JP | 61-67660 | 4/1986 |
| JP | UM 62-36871 | 3/1987 |
| JP | 63-235164 | 9/1988 |

(Continued)

*Primary Examiner*—Faye M. Fleming
(74) *Attorney, Agent, or Firm*—Miles & Stockbridge P.C.

(57) ABSTRACT

A tilt adjustable type steering apparatus for a vehicle according to the present invention has a failsafe mechanism that makes the vehicle unable to travel by locking, e.g., a speed-change shift at a parking range (P) when a steering wheel is tilted up through a large angle, and prevents the steering wheel from being tilted up when other than parking of the vehicle, e.g., during the traveling. The present tilt adjustable type steering apparatus for the vehicle is provided with a large angle tilt-up sensor 24 for detecting that a front side end support seat portion (a tilt-up stopper) 21 of a rear column member 5 abuts on a rear side end support seat portion (a tilt-up stopper) 21 of a front column member 4. When detecting a vehicle travelable state such as a release from a parking brake, a shift-down or shift-up of the change gear, etc. after the rear column member 5 has returned to within a normal on-driving tilt adjustable range (approximately ±10 degrees), a pin 25*a* of a solenoid 25 provided on the rear column member 5 enters a lock hole 12*b* of a tilt adjusting lever 12, thereby locking the tilt adjusting lever 12.

11 Claims, 14 Drawing Sheets

FOREIGN PATENT DOCUMENTS

| | | |
|---|---|---|
| JP | UM 63-189877 | 12/1988 |
| JP | 1-114570 | 8/1989 |
| JP | UM 1-115933 | 8/1989 |
| JP | UM 3-40164 | 4/1991 |
| JP | UM 5-54148 | 7/1993 |
| JP | UM 6-8148 | 2/1994 |
| JP | UM 6-42521 | 6/1994 |
| JP | 11-198821 | 7/1999 |
| JP | 2001-199350 | 7/2001 |

* cited by examiner

VEHICLE TILT TYPE STEERING DEVICE

TECHNICAL FIELD

The present invention relates to a tilt adjusting type steering apparatus for a vehicle, which is capable of making a tilt adjustment of a steering wheel within an tilt adjustable range for the time when operated (which will hereinafter be simply termed an on-driving tilt adjustable range) and is, besides, capable of tilting through a large angle in excess of this on-driving tilt adjustable range.

BACKGROUND ARTS

A tilt adjusting type steering apparatus capable of adjusting a tilt angle of a steering wheel, corresponding to a physique, a driving posture, etc. of a driver is, as disclosed in, e.g., Japanese Patent Application Laid-Open No. 11-198821, constructed such that a rear column member is so connected in a swayable manner to a rear side end of a front column member fixed to a car body (which is a so-called swing tilt).

When fastening the rear column member to a tilt adjusted position, a movable gear of the rear column member is biased to engage with a fixed gear of the front column member on one hand, and, when releasing the rear column member from being fixed by fastening to the tilt adjusted position, the engagement of the two gears is canceled by swaying the movable gear resisting a biasing force on the other hand.

Further, when making a tilt adjustment, a swayable range of the rear column member falls within the on-driving tilt adjustable range suited to the driving of a vehicle, and is generally approximately ±10 degrees.

By the way, there has been recently an increase in demands for RVs (Recreational Vehicles), and the utilization of the vehicles has also been diversified. For example, a family has a meal in a car room, the RV substitutes for a tent in camping, and so forth.

On this occasion, the steering wheel is raised upwards through a large angle and thus retreated, and then a driver's seat is rotated and directed backwards, thus forming a comparatively large effective utility space.

DISCLOSURE OF THE INVENTION

It is an object of the present invention, which was devised under such circumstances described above, to provide a tilt adjustable type steering apparatus for a vehicle that is capable of operating safely, even when a steering wheel is tilted up through a large angle exceeding an on-driving tilt adjustable range.

According to the present invention, a failsafe mechanism makes the vehicle unable to travel by locking, e.g., a speed-change shift at a parking range (P) when a steering wheel is tilted up through a large angle exceeding the on-driving tilt adjustable range, and prevents the steering wheel from being tilted up through the large angle exceeding the on-driving tilt adjustable range when other than parking of the vehicle, e.g., during the traveling.

To accomplish the above object, according to a first invention, in a tilt adjustable type steering apparatus for a vehicle, constructed such that a rear column member is connected in a swayable manner within an on-driving tilt adjustable range to a front column member fixed to a car body, a fixed gear provided on one of the front column member and the rear column member is engaged with a movable gear provided on the other of the front column member and the rear column member when fixing the rear column member to a tilt adjusted position, and the two fixed and movable gears are disengaged from each other by swaying the movable gear when releasing the rear column member from being fixed to the tilt adjusted position, there is provided an improvement characterized by comprising a detecting means for detecting that the rear column member is tilted up through a predetermined angle exceeding the on-driving tilt adjustable range.

Thus, according to the first invention, there is provided the detecting means for detecting that the rear column member is tilted up through the predetermined large angle exceeding the on-driving tilt adjustable range, and hence, when the rear column member is inclined upwards, i.e., titled up through the predetermined large angle exceeding the on-driving tilt adjustable range, for example, the speed-change shift is locked at the parking range (P), with the result that the vehicle becomes unable to travel.

Further, the tilt adjustable type steering apparatus for the vehicle according to the first invention preferably further comprises a control means for transmitting, when receiving from the detecting means a detection signal indicating that the rear column member move beyond the on-driving tilt adjustable range, a vehicle travel hindrance signal for hindering the vehicle from traveling. The control means surely makes the vehicle unable to travel when the rear column member is tilted up through the predetermined large angle.

Moreover, in the tilt adjustable type steering apparatus for the vehicle according to the first invention, the control means is preferably structured to transmit, based on the vehicle travel hindrance signal, a signal for locking the shift lever so as not shift from a parking range (P). With this contrivance, the control means surely makes the vehicle unable to travel when the rear column member is tilted up through the predetermined large angle exceeding the on-drive tilt adjustable range.

To accomplish the above object, according to a second invention, in a tilt adjustable type steering apparatus for a vehicle, constructed such that a rear column member is connected in a swayable manner within an on-driving tilt adjustable range to a front column member fixed to a car body, a fixed gear provided on one of the front column member and the rear column member is engaged with a movable gear provided on the other of the front column member and the rear column member when fixing the rear column member to a tilt adjusted position, and the two fixed and movable gears are disengaged from each other by swaying the movable gear when releasing the rear column member from being fixed to the tilt adjusted position, there is provided an improvement characterized by comprising a tilt-up detecting means for detecting that the rear column member reaches a tilt-up end position.

Thus, according to the second invention, there is provided the detecting means for detecting that the rear column member reaches the large-angle tilt position when the rear column member is tilted upwards through the predetermined large angle exceeding the on-driving tilt adjustable range, thereby surely making the vehicle unable to travel in a way that locks the speed-change shift at the parking range (P) when the rear column member is tilted up through the predetermined large angle.

To accomplish the above object, according to a third invention, in a tilt adjustable type steering apparatus for a vehicle, constructed such that a rear column member is connected in a swayable manner within an on-driving tilt adjustable range to a front column member fixed to a car body, a fixed gear provided on one of the front column member and the rear column member is engaged with a movable gear provided on the other of the front column member and the rear column member when fixing the rear column member to a tilt adjusted position, and the two fixed and movable gears are disengaged from each other by swaying the movable gear when releasing the rear column member from being fixed to the tilt adjusted position, there is provided an improvement characterized by comprising an electric lock means for preventing, when locking, a tilt-up exceeding the on-driving tilt adjustable range in a way that holds the rear column member within the on-driving tilt adjustable range, and for allowing, when non-locking, the rear column member to be tilted up in excess of the on-driving tilt adjustable range.

According to the third invention, there is provided the electric lock means for preventing, when locking, the predetermined large angle tilt-up exceeding the on-driving tilt adjustable range in a way that holds the rear column member within the on-driving tilt adjustable range, and for allowing, when non-locking, the rear column member to be tilted up through the predetermined large angle in excess of the on-driving tilt adjustable range, thereby making it possible to surely prevent the rear column member from being tilted up in excess of the tilt adjustable range when other than parking of the vehicle, e.g., during the traveling, and to allow, when non-driving, the rear column member to tilt up through the large angle in excess of the on-driving tilt adjustable range.

Further, in the tilt adjustable type steering apparatus for the vehicle according to the third invention, it is preferable that the lock means includes an electric actuator for switching over lock/non-lock state on the basis of predetermined signals.

Still further, in the tilt adjustable type steering apparatus for the vehicle according to the third invention, it is preferable that the electric actuator be a solenoid.

Moreover, the tilt adjustable type steering apparatus for the vehicle according to the third invention further comprises a control means for switching over the lock means from the non-lock state to the lock state when receiving a vehicle travel preparation/start signal for preparing to have the vehicle traveled or starting the traveling. The control means is capable of surely preventing the rear column member form being tilted up when other than parking of the vehicle, e.g., during the traveling.

Furthermore, the tilt adjustable type steering apparatus for the vehicle according to the third invention preferably comprises a switch for switching over the lock means from the lock state to the non-lock state. The lock means can be switched over from the lock state to the non-lock state through this switch, and therefore the tilt-up exceeding the on-driving tilt adjustable range can be attained only by an intention of the driver, resulting in no possibility in which the large angle tilt-up happens carelessly irrespective of the intention of the driver.

Yet further, the tilt adjustable type steering apparatus for the vehicle according to the third invention preferably comprises a control means for allowing the switch to switch over the lock means from the lock state to the non-lock state only when receiving a vehicle stop/parking signal of the vehicle that is in a stop/parking state, thereby enabling the rear column member to be tilted up in excess of the on-driving tilt adjustable range by switching over the switch to the non-lock state only when it can be confirmed that the vehicle is in the stop/parking state.

To accomplish the above object, according to a fourth invention, in a tilt adjustable type steering apparatus for a vehicle, constructed such that a rear column member is connected in a swayable manner within an on-driving tilt adjustable range to a front column member fixed to a car body, a movable gear of the front column member is biased and engaged with a fixed gear of the front column member when fastening the rear column member to a tilt adjusted position by operating a tilt adjusting lever, and the two fixed and movable gears are disengaged from each other by swaying the movable gear resisting the biasing force when releasing the rear column member from being fastened to the tilt adjusted position, there is provided an improvement characterized by comprising a tilt adjusting lever lock means for locking the tilt adjusting lever. According to the fourth invention, the tilt adjusting lever lock means for locking the tilt adjusting lever is provided, and it is therefore possible to prevent the tilt-up of the steering wheel during, e.g., the traveling.

EMBODIMENTS OF THE INVENTION

A tilt adjusting type steering apparatus for a vehicle in embodiments of the present invention will hereinafter be described with reference to the accompanying drawings.

First Embodiment

Figure 1:
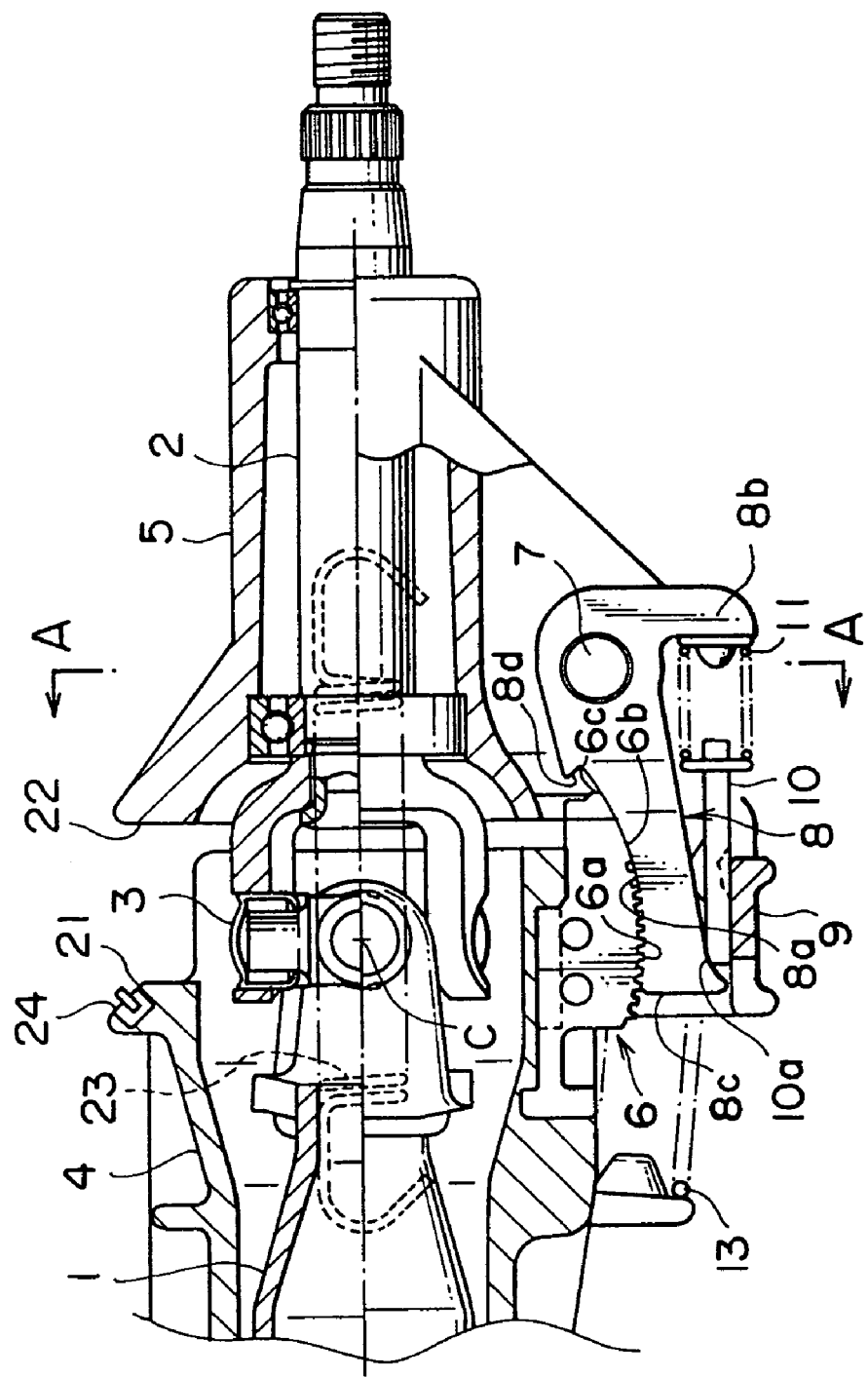
FIG. 1 is a vertical sectional view of a tilt type steering apparatus for a vehicle in a first embodiment of the present invention.
Figure 2:
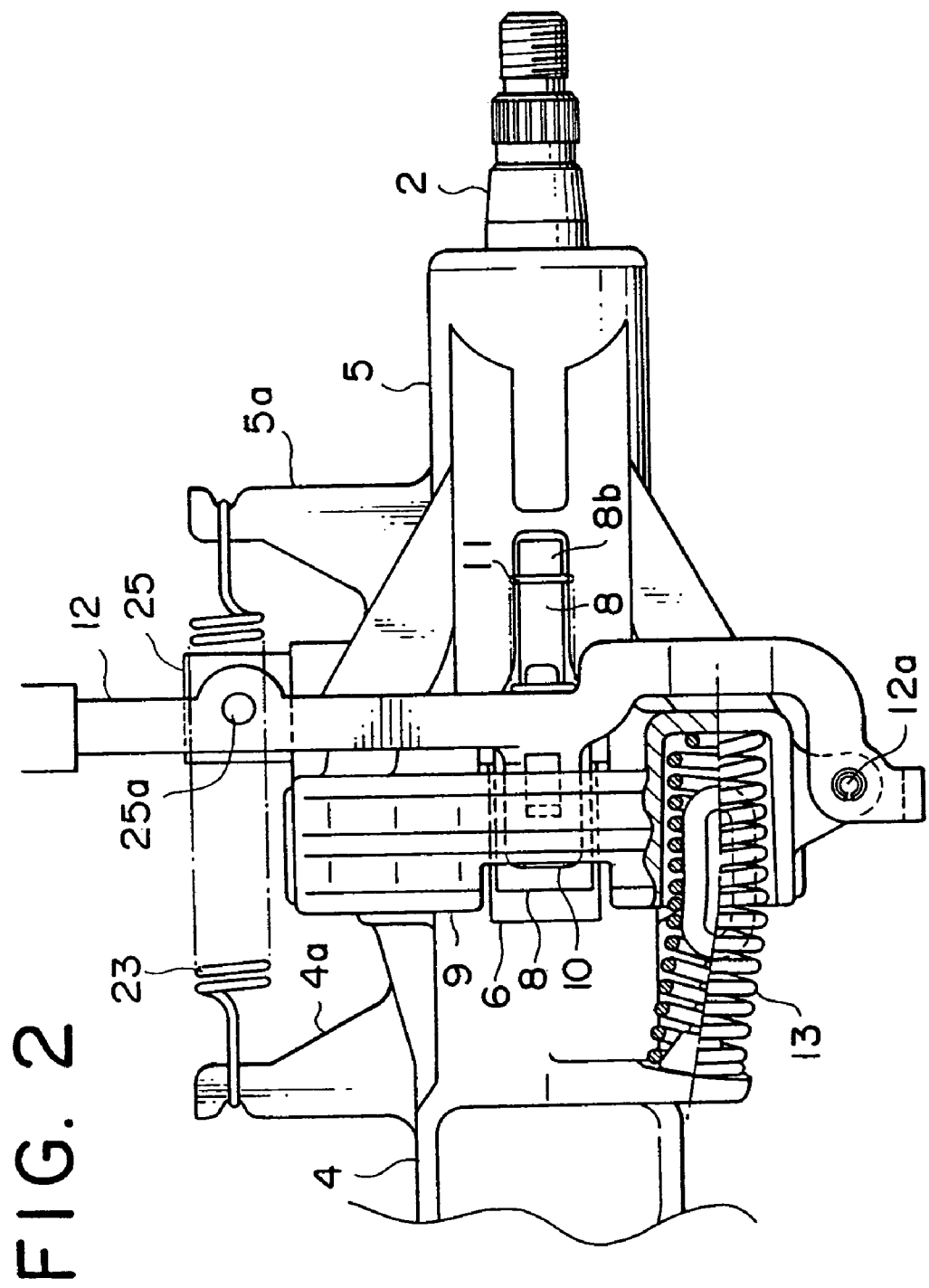
FIG. 2 is a bottom view of the tilt type steering apparatus for the vehicle shown in FIG. 1.
Figure 3:
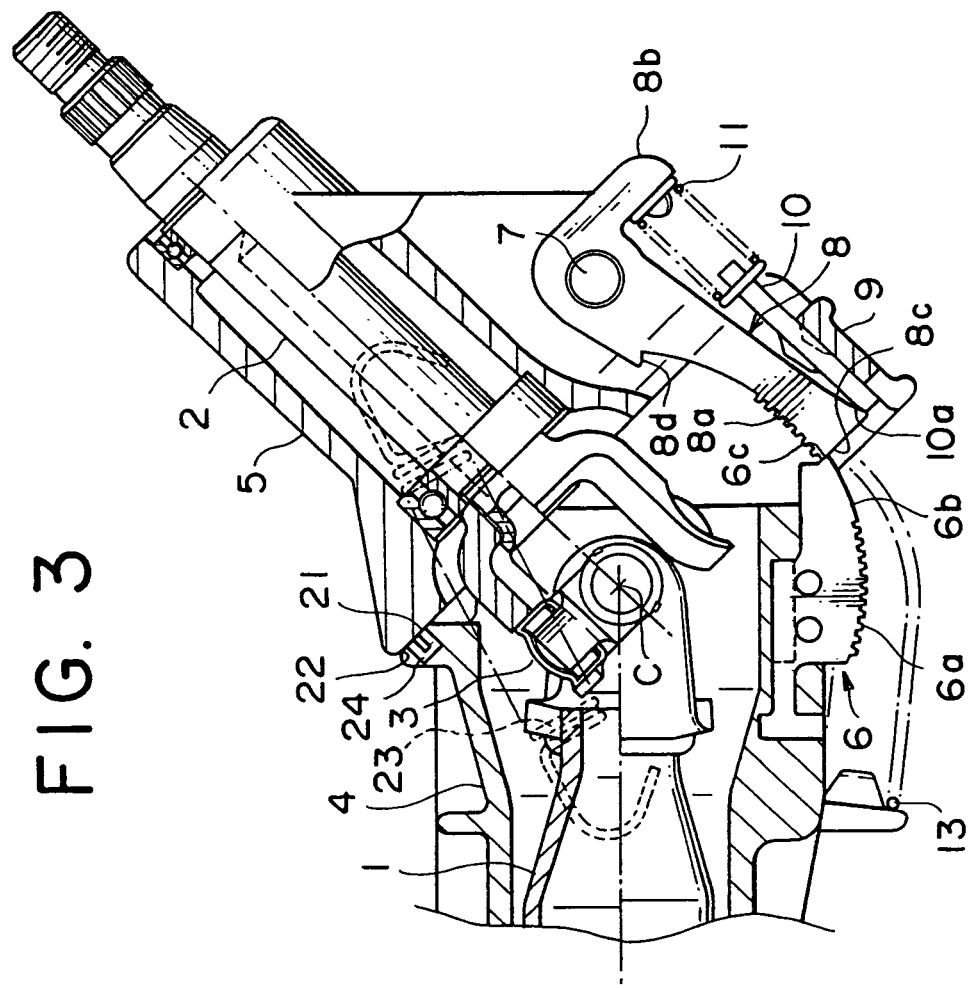
FIG. 3 is a vertical sectional view of the tilt type steering apparatus for the vehicle shown in FIG. 1, showing a state where a rear column member is tilted up through a large angle in excess of an on-driving tilt adjustable range.
Figure 4:
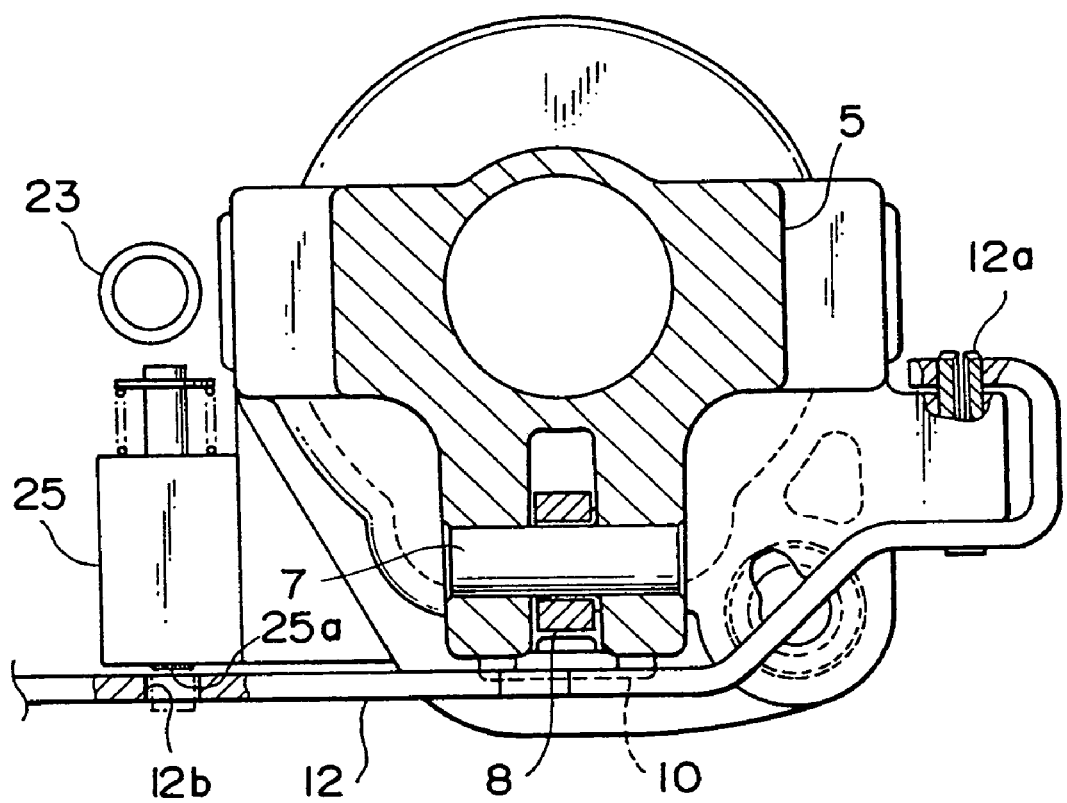
FIG. 4 is a cross sectional view taken along the line A—A in FIG. 1.

FIG. 1 is a vertical sectional view showing the tilt adjustable type steering apparatus for the vehicle in a first embodiment of the present invention. FIG. 2 is a bottom view of the tilt adjustable type steering apparatus for the vehicle shown in FIG. 1. FIG. 3 is a vertical sectional view of the tilt adjustable type steering apparatus for the vehicle shown in FIG. 1, showing a state where a rear column member is tilted up through a large angle in excess of an on-driving tilt adjustable range. FIG. 4 is a cross sectional view taken along the line A—A in FIG. 1.

A steering shaft is, in a front portion of the vehicle, divided into a front steering shaft 1 connected via an intermediate shaft coupling, etc. to a steering gear mechanism (unillustrated) of the vehicle, and into a rear steering shaft 2 with its rear side end fixedly provided with a steering wheel (unillustrated), these shafts being connected by a universal joint 3. The front steering shaft 1 and the rear steering shaft 2 are rotatably accommodated in a front column member 4 and a rear column member 5, respectively.

The rear column member 5 is connected in a swayable manner to a rear portion of the front column member 4 fixed to the car body and is swayable within an on-driving tilt adjustable range (approximately ±10 degrees) about a tilt center C. Note that the tilt center C is concentric with the universal joint 3.

A fixed gear 6 having a gear teeth portion 6a is fixed to an undersurface of the front column member 4. A movable gear 8 having a gear teeth portion 8a meshing with the gear teeth portion 6a of the fixed gear 6 is pivotally supported in the swayable manner around on a pivot 7 provided in the rear column member 5. Note that the respective gear teeth portions 6a, 8a are arranged circularly around the tilt center C.

A reaction member 9 integral with the rear column member 5 is extended in a car-widthwise direction below the movable gear 8 (see FIG. 2). A wedge-shaped member 10 having a tapered surface 10a for pressing a rear tapered surface of the movable gear 8 in a way that abuts on and presses the rear tapered surface of the movable gear 8, is so disposed as to be movable in back-and-forth directions between the movable gear 8 and the reaction member 9.

A press spring (a compression spring) 11 is disposed between a rear side end of the wedge-shaped member 10 and a rear extended piece 8b extending from the movable gear 8. The press spring (the compression spring) 11 always biases the gear teeth portion 8a of the movable gear 8 in such a direction that the gear teeth portion 8a of the movable gear 8 and the gear teeth portion 6a of the fixed gear 6 mesh with each other. The press spring (the compression spring) 11 has a function of biasing the movable gear 8 through the extended piece 8b in a releasing direction (counterclockwise in FIG. 1) also when releasing the rear column member 5 from being fixed to the tilt adjusted position.

As shown in FIG. 2, a tilt adjusting lever 12 is formed integrally with the wedge-shaped member 10 and extends on both sides of the rear portion of the wedge-shaped member 10. The tilt adjusting lever 12 is swayable about a center-of-rotation-of-lever pin 12a provided on the rear column member 5.

As illustrated also in FIG. 2, a support spring (a compression spring) 13 is provided between the front column member 4 and the rear column member 5. This configuration prevents descents of the rear column member 5, the steering wheel, etc. when the two gears 6, 8 disengage from each other. A side end surface 8d of the movable gear 8 functions, when the rear column member is in the lowest tilt position, as a stopper that abuts on the side end surface 6c of the fixed gear 6.

In the thus constructed tilt adjustable type steering apparatus, when making the tilt adjustment, the tilt adjusting lever 12 is swayed backwards (FIG. 2) of the vehicle, resisting the biasing force of the press spring (the compression spring) 11, thereby retreating the wedge-shaped member 10 backwards (FIG. 1).

As a result, the movable gear 8 is assisted by the biasing force of the press spring (the compression spring) 11 and is thereby rotated counterclockwise about the pivot 7 in FIG. 1, thus canceling the engagement with the fixed gear 6. This enables the rear column member 5 to release from being fixed to the tilt adjusted position.

The tilt adjustment is performed in a way that tilts the rear column member 5 within the on-driving tilt adjustable range (approximately ±10 degrees) suited to the driving of the vehicle.

Upon detachment of the tilt adjusting lever 12 after making the tilt adjustment, the tilt adjusting lever 12 is swayed forwards (FIG. 2) of the vehicle with the assistance of the biasing force of the spring (the compression spring) 11, thereby moving the wedge-shaped member 10 forwards (FIG. 1).

As a result, the movable gear 8, with its gear teeth portion 8a being pressed against the gear teeth portion 6a of the fixed gear 6 by dint of the wedge-shaped member 10 biased by the press spring (the compression spring) 11, firmly meshes with the fixed gear 6. This makes it possible to fasten the rear column member 5 to the tilt adjusted position.

Given next is an explanation of a case of tilting up the rear column member through a large angle in excess of the on-driving tilt adjustable range.

In the first embodiment, as illustrated in FIG. 3, the universal joint 3 connecting the front steering shaft 1 and the rear steering shaft 2 together so as to be swayable about the tilt center C, is constructed such that the rear column member 5 can be, for instance, bent through up to approximately 60 degrees.

With this construction, when the vehicle is parked, the rear column member 5 can be tilted up through a large angle (e.g., 50 degrees) exceeding the on-driving tilt adjustable range (approximately ±10 degrees).

When the fixation of the rear column member 5 to the tilt adjusted position is canceled by pulling the tilt lever 12 backwards of the vehicle by the hand, the rear column member 5 starts being tilted up by the first support spring 13.

As shown in FIG. 3, when tilting up the rear column member 5 through the large angle, a contrivance is that a front side end support seat portion (a tilt-up stopper) 22 formed on the rear column member 5 abuts on a rear side end support seat portion (a tilt-up stopper) 21 formed on the front column member 4.

The fixed gear 6 has a non-teeth area 6b formed with none of teeth, adjacent to the gear teeth portion 6a thereof. The movable gear 8 is structured so that a side end surface 8c thereof is engaged with a side end surface 6c of the fixed gear 6 by the biasing force of the press spring (the compression spring) 11 and thus locked.

With this configuration, till the tilt-up of the rear column member 5 is started and then completed, the movable gear 8 moves while its gear teeth portion 8a slides on the non-teeth area 6b of the fixed gear 6. Thereafter, as shown in FIG. 3, when the tilt-up through the large angle is completed, the movable gear 8 operates such that the gear teeth portion 8a thereof separates from the non-teeth area 6b, while its side end surface 8c is engaged with the side end surface 6c of the fixed gear 6 and thus locked.

As illustrated in FIGS. 2 and 3, a second support spring (a tension spring) 23 for the tilt-up through the large-angle is disposed between a support piece 4a formed on the front column member 4 and a support piece 5a formed on the rear column member 5.

As shown in FIG. 1, the second support spring (the tension spring) 23 is disposed so that when the rear column member 5 is set in such a neutral position that a front column axial line in the on-driving tilt adjustable range (approximately ±10 degrees) is coincident with a rear column axial line, the central line thereof is substantially parallel with the axial lines of the steering shafts 1, 2 and extends through the tilt center C or in the vicinity thereof as viewed from the back.

With this configuration, the second support spring (the tension spring) 23 does not exhibit an elastic tension in the normal on-driving tilt adjustable range, and, as shown in FIG. 3, only when tilted up through the large angle exceeding the on-driving tilt adjustable range, elastically pulls and tilts the rear column member 4 up (counterclockwise, i.e., in such a direction as to raising the rear column member 5) by offsetting the central line thereof from the tilt center, whereby the rear column member 5 can thus be held in a tilt-up completed position. Accordingly, the steering wheel is tilted up through the large angle and can be surely held in this position.

Note that the first support spring (the compression spring) 13 is, because of a large quantity of movement of the rear column member, hard to retain a tilt-up force up to the uppermost position of the rear column member, however, the tension force of the second support spring 23 acts and tilts the rear column member up in an upper position.

The rear side end support seat portion (the tilt-up stopper) 21 of the front column member 4 is provided with a tilt-up sensor (a tilt-up detecting means) 24 for detecting that the front side end support seat portion (the tilt-up stopper) 22 of the rear column member 5 abuts on the rear side end support seat portion 21 thereof.

When the tilt-up sensor 24 functions, a speed-change shift is locked at a parking range (P), with the result that the vehicle becomes unable to travel. An engine is, however, structured to operate.

Note that if the large angle tilt-up sensor (the large angle tilt-up detecting means) 24 is provided in other position and so on, when the front side end support seat portion (the tilt-up stopper) 22 of the rear column member 5 abuts on the rear side end support seat portion (the tilt-up stopper) 21 of the front column member 4, an impact absorbing member for absorbing an impact, etc. caused by this abutment may also be disposed in that position of the sensor 24.

In the case of detecting a vehicle travelable state such as a release from a parking brake, a shift-down or shift-up of the change gear (speed-change shift), etc. after the rear column member 5 has returned to within the normal on-driving tilt adjustable range (approximately ±10 degrees), as shown in FIG. 4, a pin 25a of a solenoid (a tilt adjusting lever locking means) 25 provided on the rear column member 5 enters a lock hole 12b of the tilt adjusting lever 12, thereby locking the tilt adjusting lever 12.

The rear column member 5 can be thereby prevented from being tilted up when other than parking of the vehicle, e.g., during the traveling.

The apparatus being configured as described above, as shown in FIG. 3, if the rear column member 5 is tilted up through a larger angle (e.g., 50 degrees) in excess of the on-driving tilt adjustable range (approximately ±10 degrees) during the parking of the vehicle, and if capable of confirming that the speed-change shift is set in, e.g., the parking range (P), the pin 25a of the solenoid 25 moves back from the lock hole 12b of the tilt adjusting lever 12, thereby unlocking the tilt adjusting lever 12.

The wedge-shaped member 10 is retreated backwards by swaying the tilt adjusting lever 12 backwards of the vehicle while resisting the biasing force of the press spring (the compression spring) 11, and the movable gear 8 is rotated counterclockwise and is thus disengaged from the fixed gear 6, thereby releasing the rear column member 5 from being fixed to the tilt adjusted position.

Subsequently, the rear column member 5 is tilted up through a large angle (e.g., 50 degrees) while holding the tilt adjusting lever 12 in the tilt-fixation-released state.

On this occasion, during a period till the completion of the tilt-up of the rear column member 5 since the tilt-up thereof has been started, the movable gear 8 moves while the gear teeth portion 8a thereof slides on the non-teeth area 6b of the fixed gear 6.

Thereafter, upon the completion of the large angle tilt-up, the movable gear 8 operates so that the gear teeth portion 8a thereof is separated from the non-teeth area 6a by the biasing force of the press spring 11, and the side end surface 8c thereof is engaged with the side end surface 6c of the fixed gear 6 and thus locked. Accordingly, the steering wheel can be surely held unmovable in that position even if the driver hangs on to the steering wheel and so forth.

When the large angle tilt-up is completed, the tilt-up sensor 24 detects that the front side end support seat portion (the tilt-up stopper) 22 of the rear column member 5 abuts on the rear side end support seat portion (the tilt-up stopper) 21 of the front column member 4. With this contrivance, the speed-change shift is locked at the parking range (P), thereby making the vehicle unable to travel.

The second support spring (the tension spring) 23, only when the rear column member 5 is tilted up through the large angle, elastically pulls the rear column member 5 (counterclockwise, i.e., in the direction of raising the rear column member 5) and can thus hold the same member 5 by offsetting the central line thereof from the tilt center. Hence, the steering wheel, when tilted up through the large angle, can be surely held in that position.

On the other hand, in the case of returning the rear column member 5 to within the on-driving tilt adjustable range (approximately ±10 degrees) from the large angle tilt-up state, the tilt adjusting lever 12 is swayed backwards (FIG. 2) of the vehicle with a resistance against the biasing force of the press spring (the compression spring) 11, and the movable gear 8 is assisted by the biasing force of the press spring 11 and thus rotated counterclockwise in FIG. 3, thereby unlocking the side end surface 8c of the movable gear 8 and the side end surface 6c of the fixed gear 6 from each other. In this state, the rear column member 5 is returned and is, after making the tilt adjustment within the on-driving tilt adjustable range (approximately ±10 degrees), fixed to the tilt position by fastening.

Thereafter, in the case of detecting the vehicle travelable state such as the release from the parking brake, the shift-down or shift-up of the change gear (speed-change shift), etc., the pin 25a of the solenoid 25 provided on the rear column member 5 enters the lock hole 12b of the tilt adjusting lever 12, thereby locking the tilt adjusting lever 12. The rear column member 5 can be thereby prevented from being tilted up when other than parking.

Second Embodiment

Figure 5:
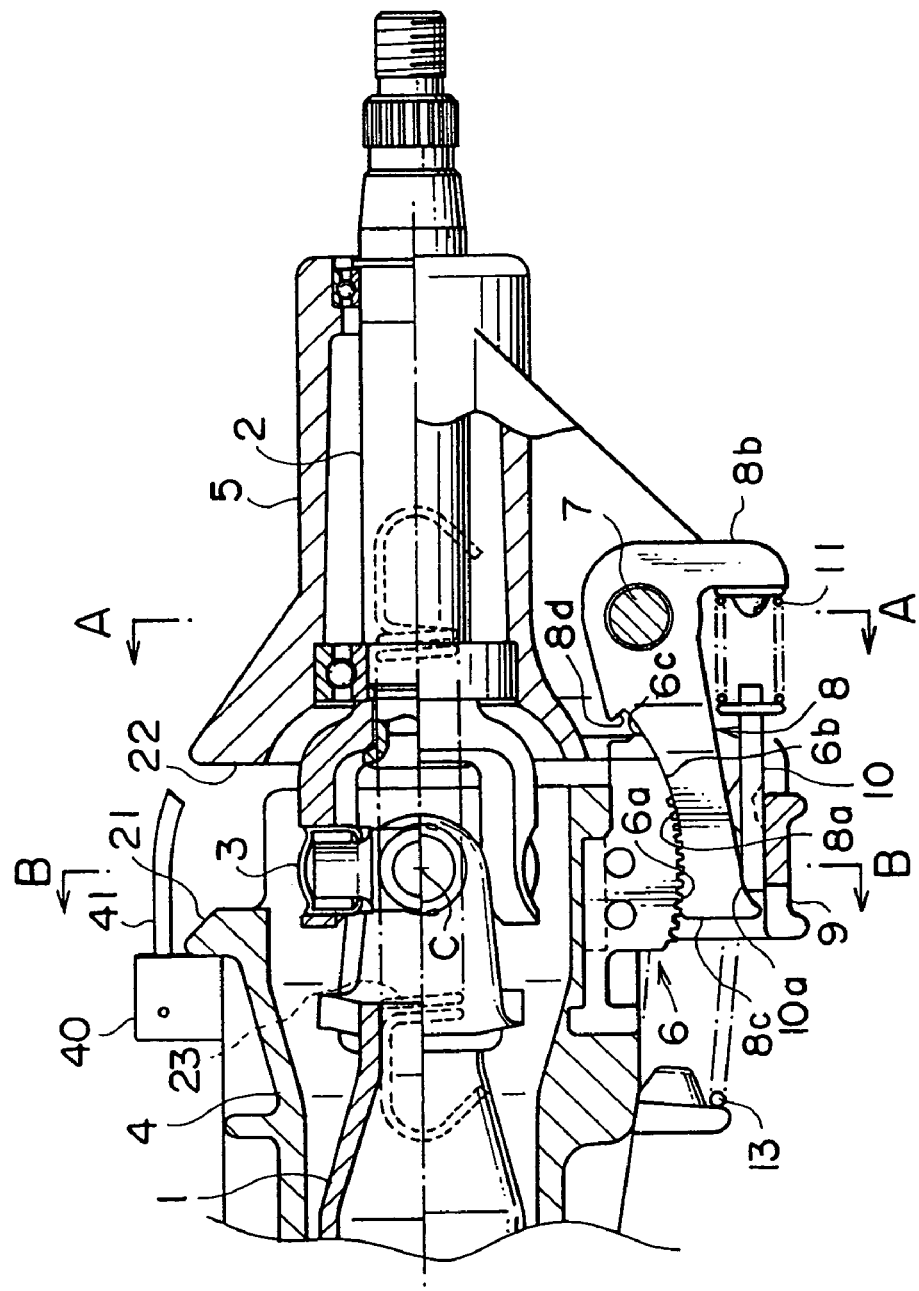
FIG. 5 is a vertical sectional view of the tilt type steering apparatus for the vehicle in a second embodiment of the present invention.
Figure 6:
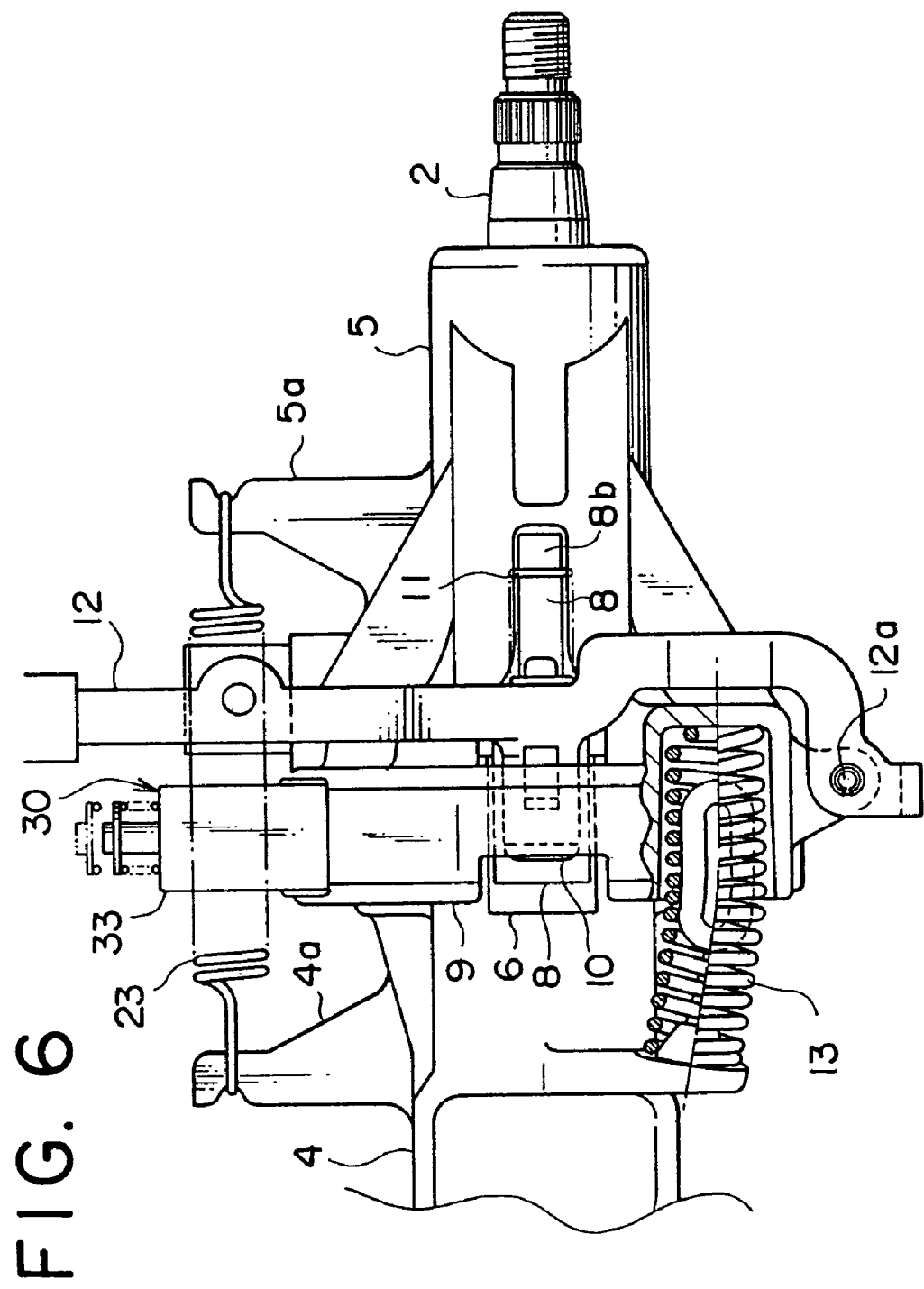
FIG. 6 is a bottom view of the tilt type steering apparatus for the vehicle shown in FIG. 5.

FIG. 5 is a vertical sectional view of the tilt adjustable type steering apparatus for the vehicle in a second embodiment of the present invention. FIG. 6 is a bottom view of the tilt adjustable type steering apparatus for the vehicle shown in FIG. 5.

Figure 7:
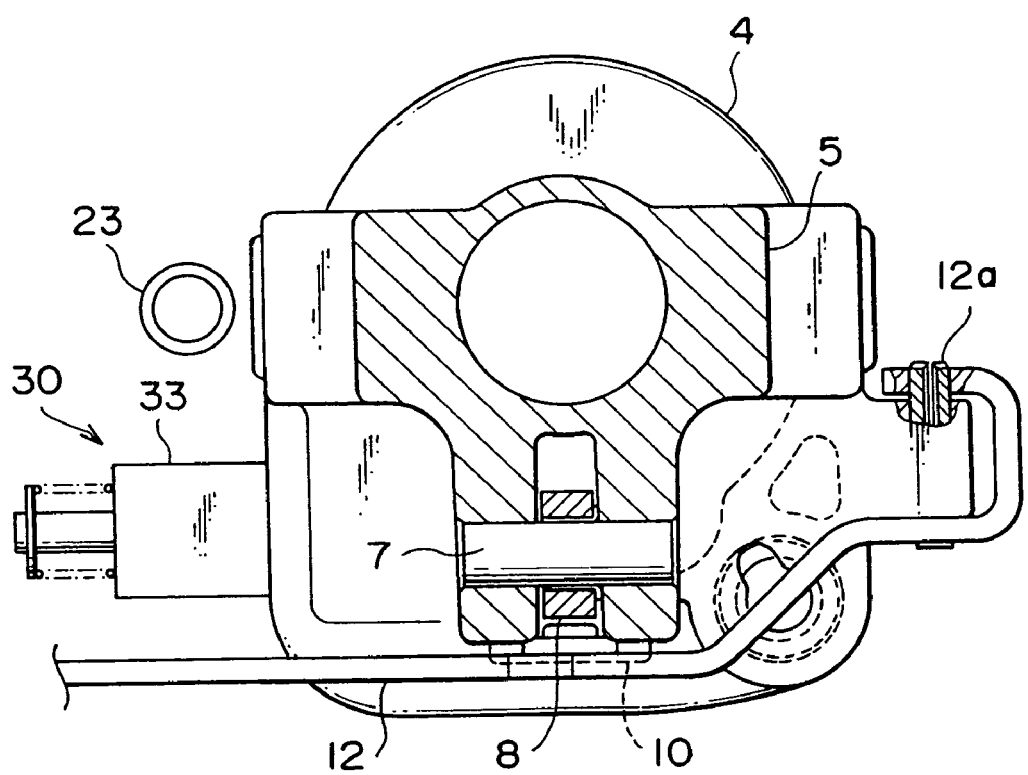
FIG. 7 is a cross sectional view taken along the line A—A in FIG. 5.
Figure 8:
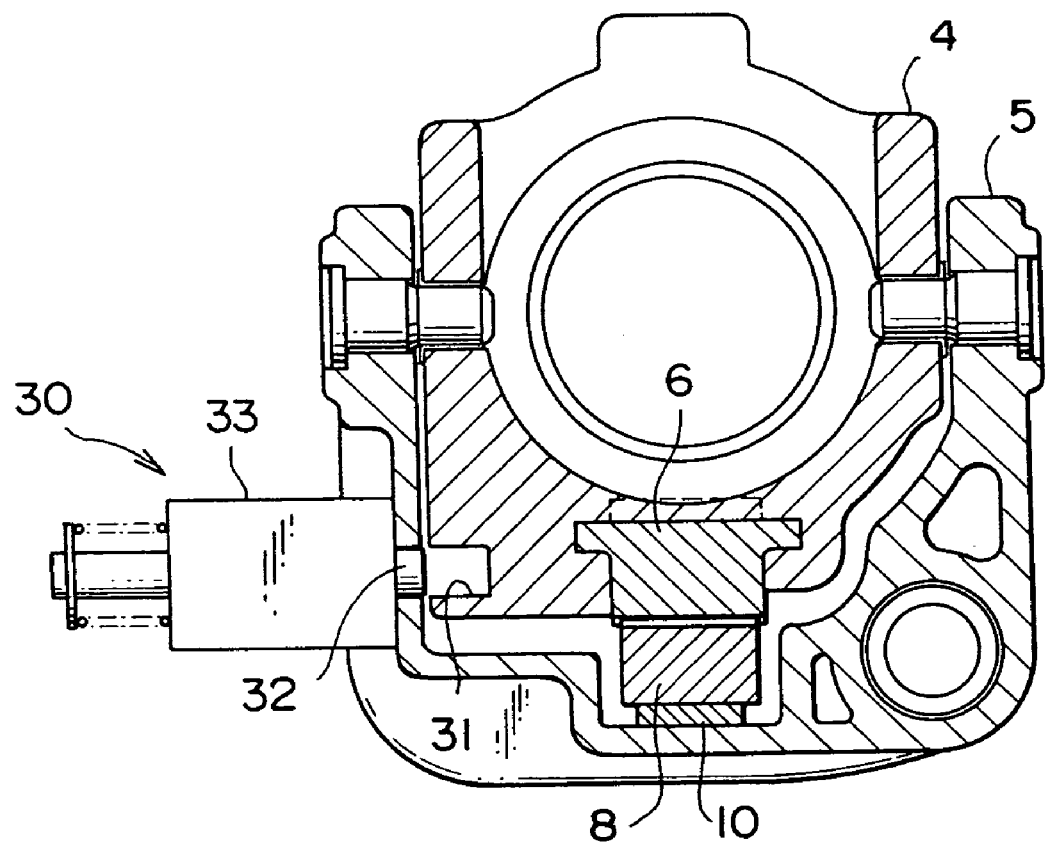
FIG. 8 is a cross sectional view taken along the line B—B in FIG. 5, showing a non-lock state.
Figure 9:
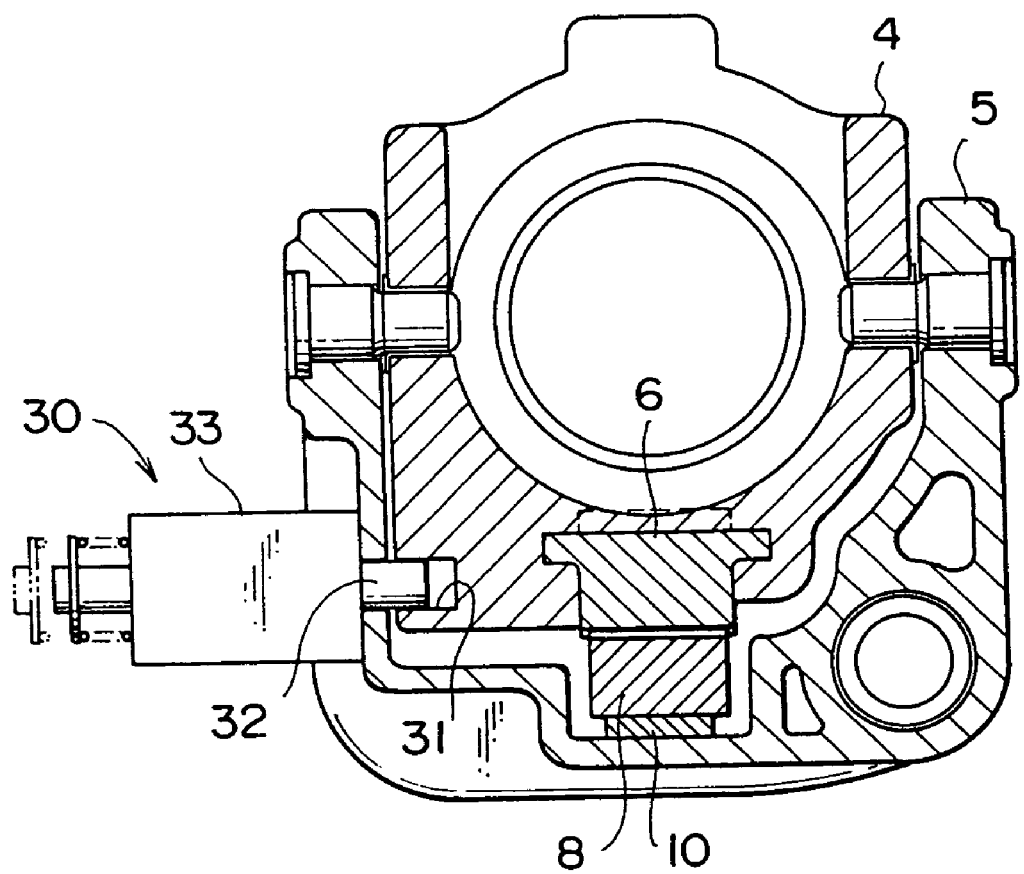
FIG. 9 is a cross sectional view taken along the line B—B in FIG. 5, showing a lock state.

FIG. 7 is a cross sectional view taken along the line A—A in FIG. 5. FIG. 8 is a cross sectional view taken along the line B—B in FIG. 5, showing a non-lock state. FIG. 9 is a cross sectional view taken along the line B—B in FIG. 5, showing a lock state.

Figure 10:
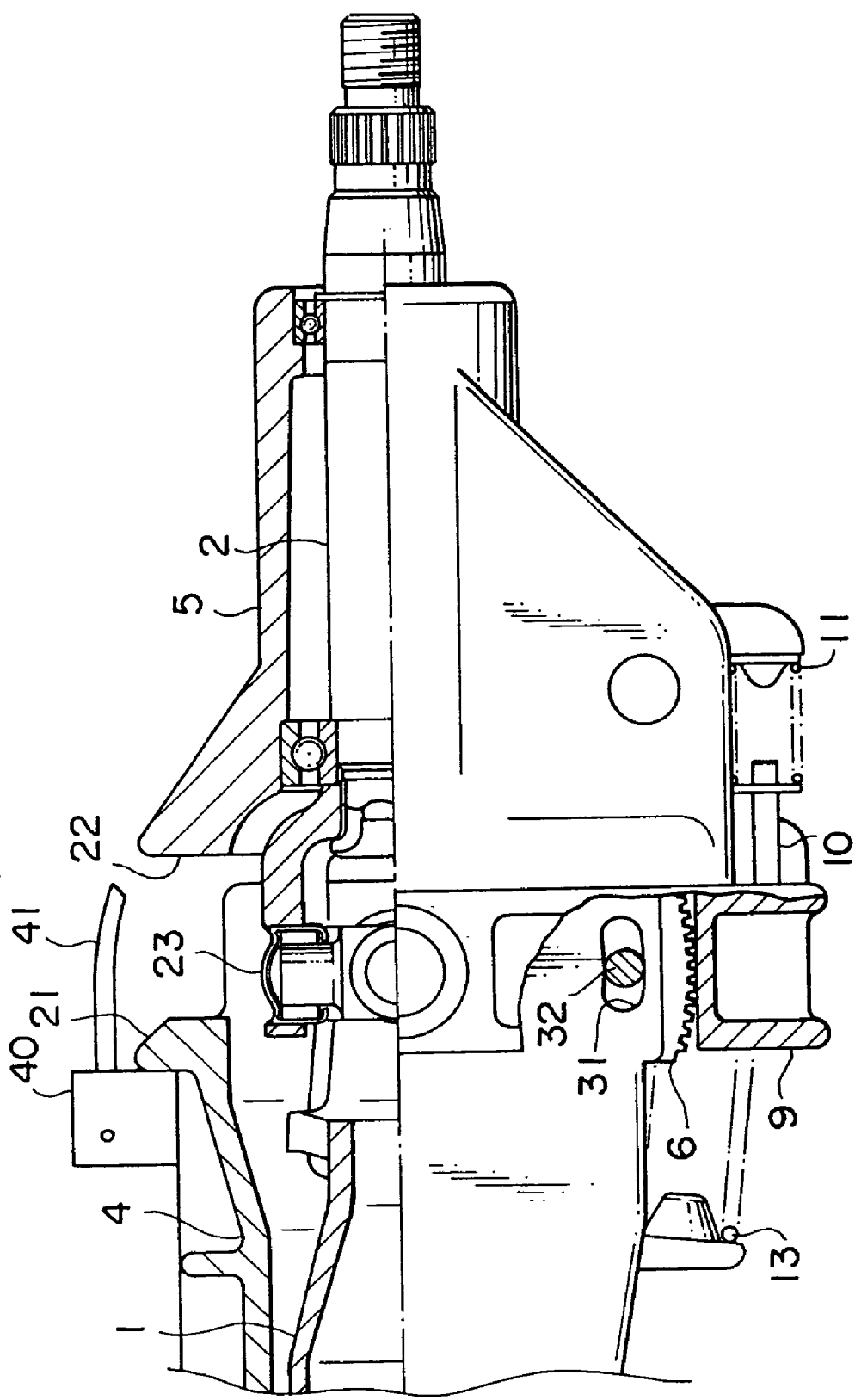
FIG. 10 is a vertical sectional view of the tilt type steering apparatus for the vehicle shown in FIG. 5.
Figure 11:
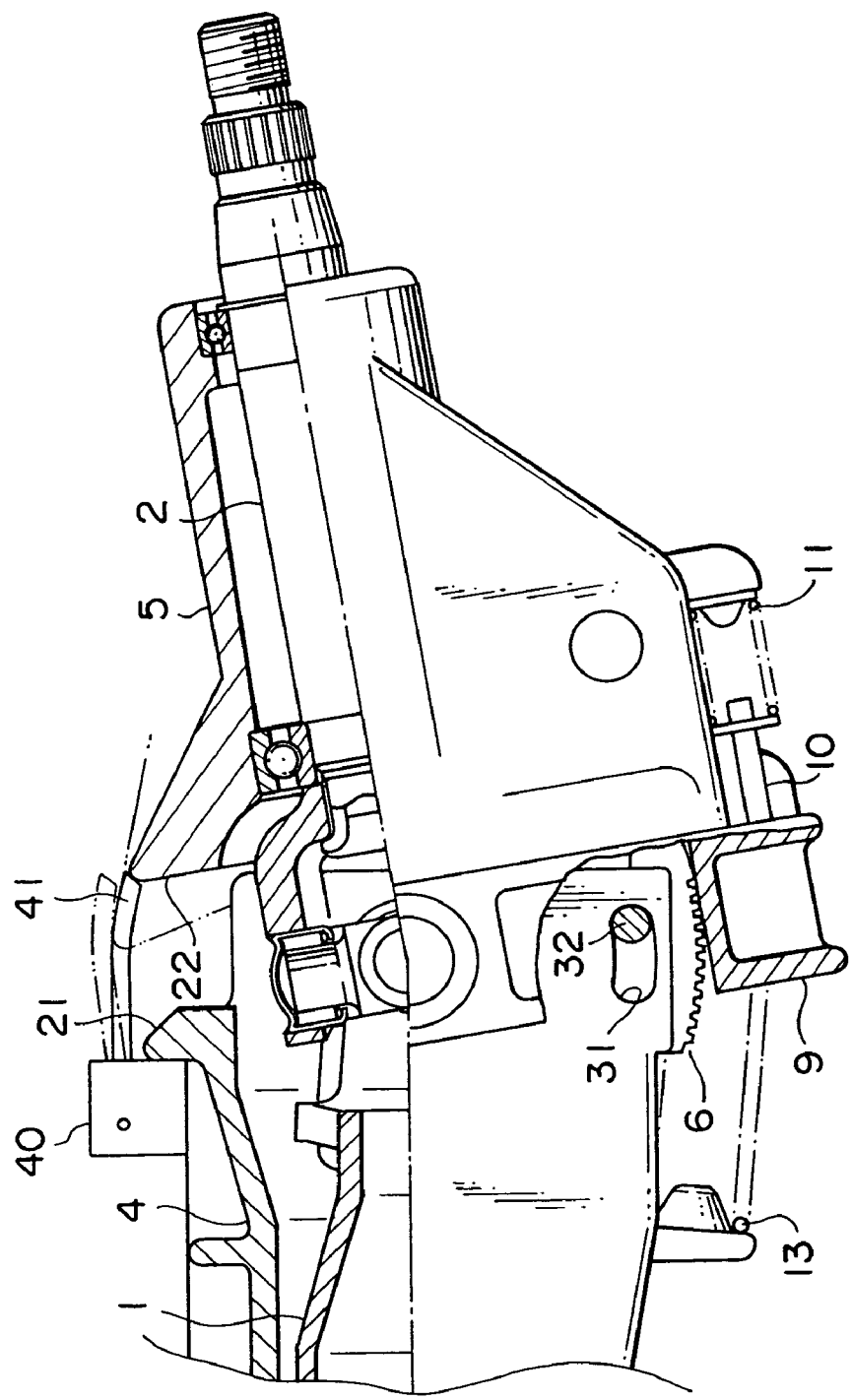
FIG. 11 is a vertical sectional view of the tilt type steering apparatus for the vehicle shown in FIG. 5, showing an uppermost position in a tilt adjustable area.
Figure 12:
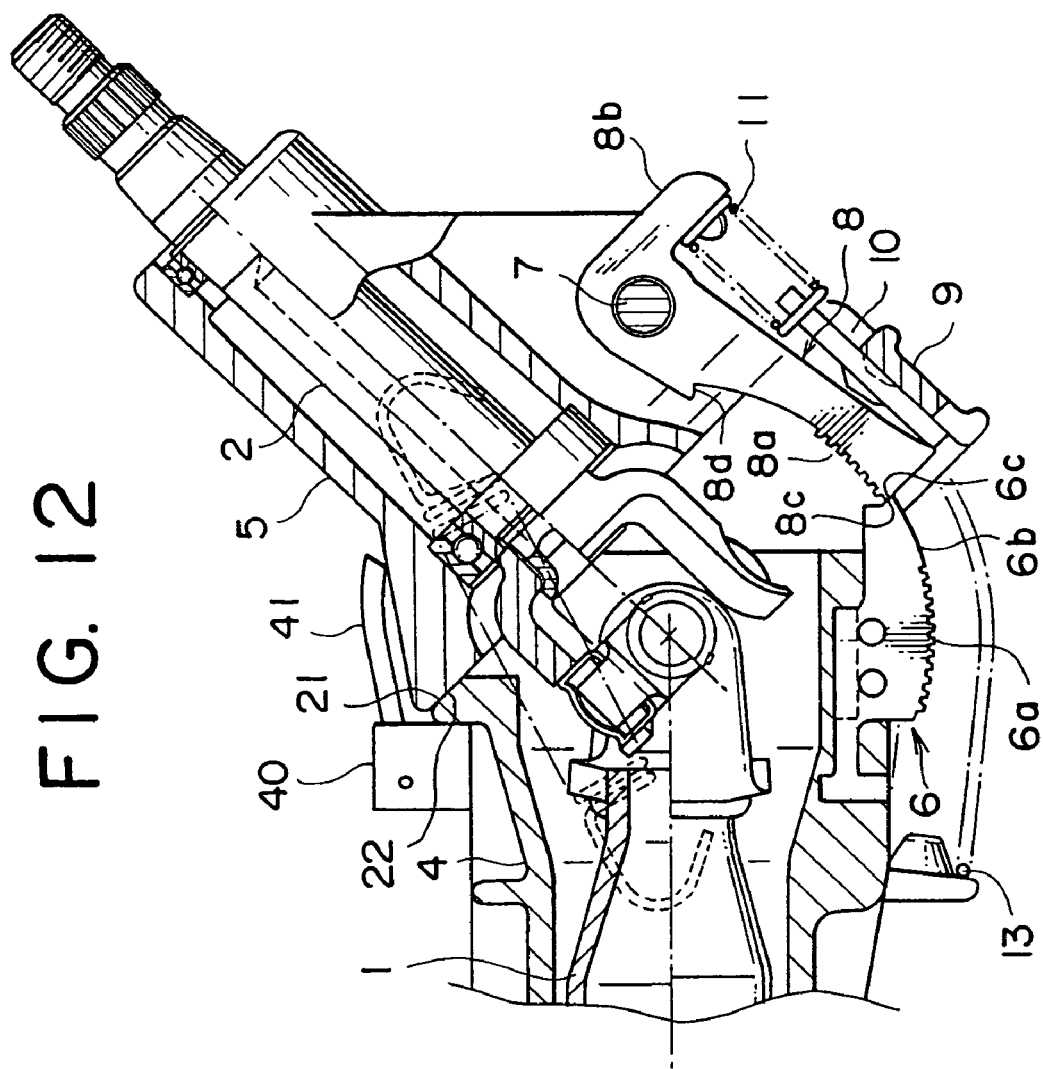
FIG. 12 is a vertical sectional view of the tilt type steering apparatus for the vehicle shown in FIG. 5, showing a state where the rear column member is tilted up through a large angle exceeding an on-driving tilt adjustable range.

FIG. 10 is a vertical sectional view of the tilt adjustable type steering apparatus for the vehicle shown in FIG. 5. FIG. 11 is a vertical sectional view of the tilt adjustable type steering apparatus for the vehicle illustrated in FIG. 5, showing an uppermost position of a tilt adjustable area. FIG. 12 is a vertical sectional view of the tilt adjustable type steering apparatus for the vehicle illustrated in FIG. 5, showing a state where the rear column member is tilted up through a predetermined large angle in excess of the on-driving tilt adjustable range.

Figure 13:
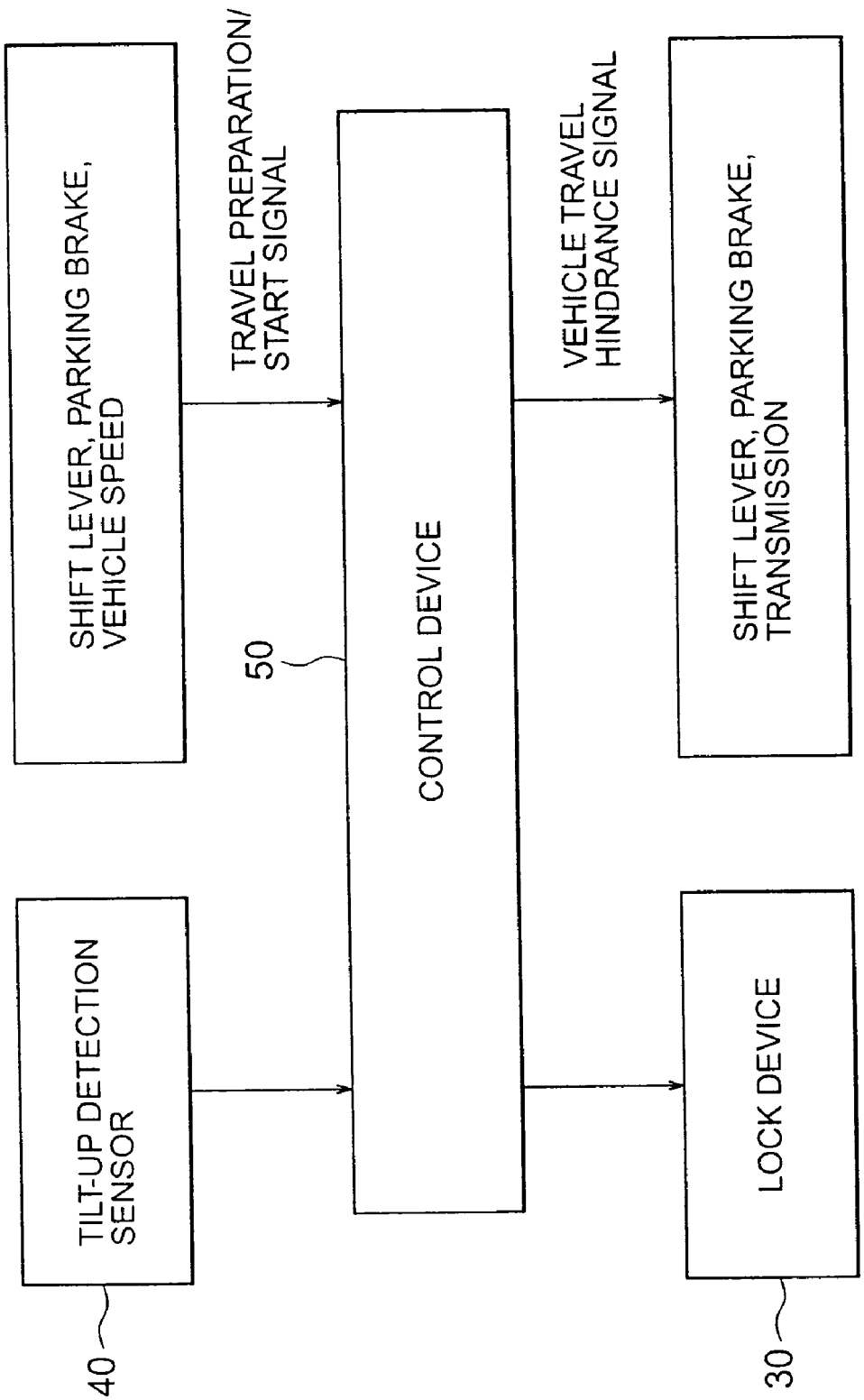
FIG. 13 is a control block diagram in an example 1 of the second embodiment of the present invention.
Figure 14:
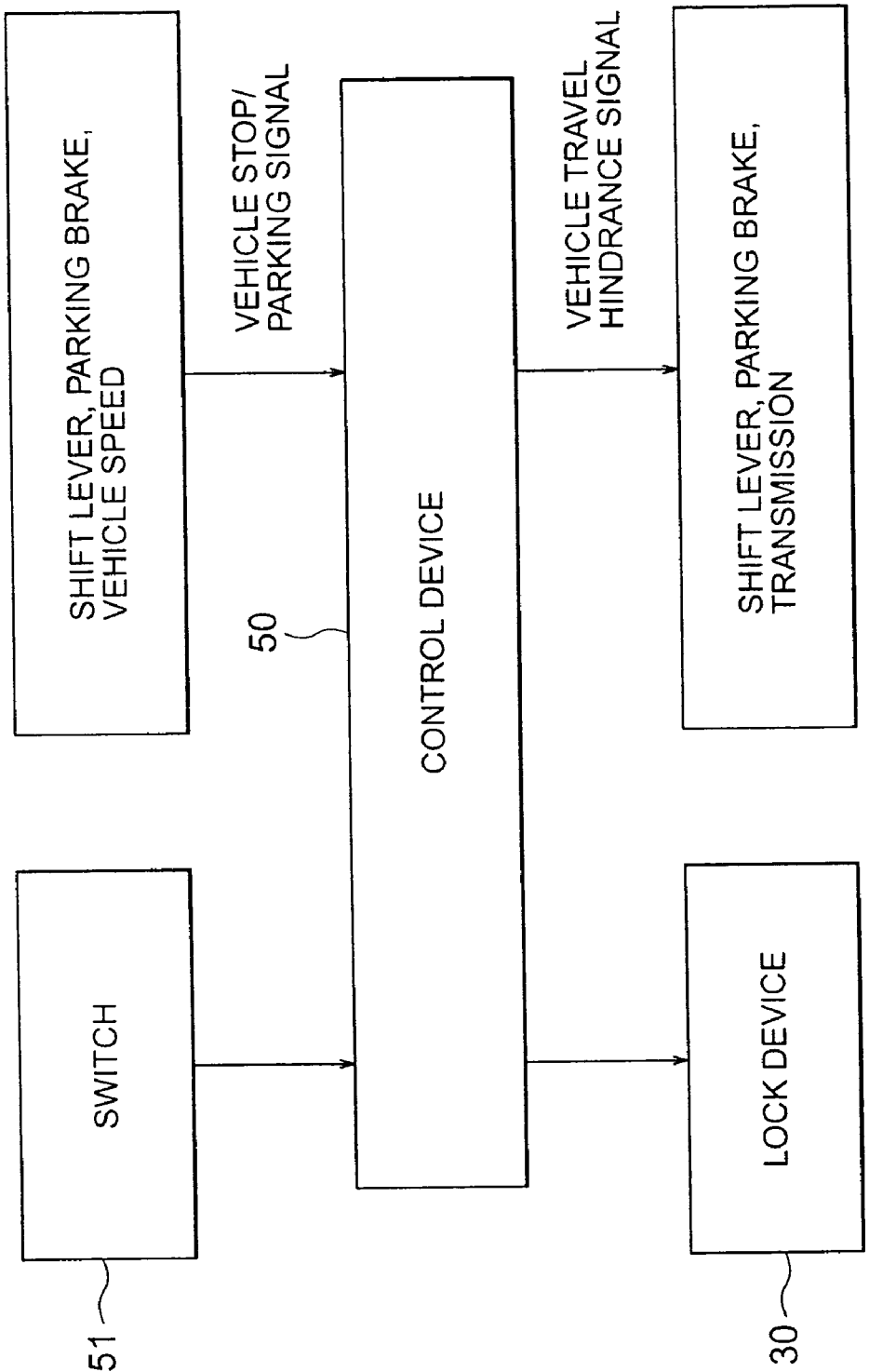
FIG. 14 is a control block diagram in an example 2 of the second embodiment of the present invention.

FIG. 13 is a control block diagram in an example 1 of the second embodiment of the present invention. FIG. 14 is a control block diagram in an example 2 of the second embodiment of the present invention.

According to the present second embodiment, as shown in FIGS. 6 through 9, there is provided an electric lock device 30, structured to switch over lock/non-lock states on the basis of predetermined signals, for preventing, when locking, the tilt-up exceeding the on-driving tilt adjustable range in a way that holds the rear column member 5 within the on-driving tilt adjustable range, and for allowing, when non-locking, the rear column member 5 to be tilted up in excess of the on-driving tilt adjustable range.

To be specific, the lock device 30 includes a lock elongate hole 31 formed in the front column member 4, a lock pin 32 that moves into and moves back off the lock elongate hole 31, and a solenoid 33 (which is an electric actuator) for moving this lock pin 32 into and back off the hole 31. The solenoid 33 is, as illustrated in FIGS. 8 and 9, fitted to the rear column member 5 and moves following up the tilt motion of the rear column member 5.

When making the tilt adjustment, as shown in FIGS. 10 and 11, the lock pin 32 is capable of moving within the range (i.e., the on-driving tilt adjustable range) of the lock elongate hole 31 together with the rear column member 5 of which the tilt is adjusted, while engaging with the lock elongate hole 31.

Further, as shown in FIGS. 9, 10 and 11, in a state where the lock pin 32 engages with the lock elongate hole 31, it is possible to hinder the tilt-up exceeding the on-driving tilt adjustable range by holding the rear column member 5 within the on-driving tilt adjustable range, thereby making is feasible to prevent the rear column member 5 from being tilted up when other than parking of the vehicle, e.g., during the traveling.

Moreover, as shown in FIGS. 8 and 12, when the lock pin 32 retreats and disengages from the lock elongate hole 31 and comes to the non-lock state, the rear column member 5 is enabled to tilt up.

It may suffice that the solenoid 33 is the electrical actuator, and this may also be an electric motor, etc. Further, the solenoid 33 is, as it is fitted with a permanent magnet, when moved rightwards in FIG. 9, the lock pin 32 becoming attracted to the permanent magnet, capable of keeping the lock-ON state even if not electrified and has neither a necessity of continuing to be electrified nor an exothermic possibility.

According to the present second embodiment, as shown in FIGS. 10 through 12, a tilt-up detection sensor (a tilt-up detecting means) 40 for detecting that the rear column member exceeds the on-driving tilt adjustable range, is provided in the rear portion of the front column member 4.

As depicted by an imaginary line in FIG. 11, if the rear column member moves up beyond the uppermost position of the tilt adjustable area, a probe 41 of the tilt-up detection sensor 40 abuts on the front side end support seat portion (the tilt-up stopper) 22 of the rear column member 5, thereby switching over to an ON-state.

As illustrated in FIG. 12, in the state where the rear column member 5 is tilted up through a predetermined large angle, the probe 41 is, of course, in the ON-state.

Moreover, according to the present second embodiment, as shown in FIGS. 13 and 14, a control device 50 for the tilt-up detection sensor 40 and the lock device 30 as well, is provided. This control device 50 will be described in detail in the following examples 1 and 2.

Second Embodiment:Example 1

In this example 1, the lock device 30 is normally in the non-lock state, wherein the rear column member 5 can be always tilted up.

As shown in FIG. 13, however, when the vehicle is going to prepare to travel or to start traveling, the lock device 30 is structured to switch over to the lock state from the non-lock state.

Namely, as shown in FIG. 13, in such cases that the shift lever is shifted from the parking range (P), a clutch of a manual transmission car is pedaled, the parking brake is released and a vehicle speed is detected, vehicle travel preparation/start signals for preparing to have the vehicle traveled or starting the traveling, are inputted as vehicle information to the control device 50.

Note that there may be used either all or at least one of the signals exemplified as the vehicle travel preparation/start signal.

The control device 50, as shown in FIG. 13, upon receiving this vehicle travel preparation/start signal, transmits to the lock device 30 a drive signal for switching over the lock device 30 from the non-lock state to the lock state.

The lock device 30, based on this drive signal, drives the solenoid 33 to make, as shown in FIGS. 9 and 10, the lock pin 32 enter the lock elongate hole 31, thereby locking the rear column member 5.

With this contrivance, it is feasible to surely prevent the rear column member from being tilted up when other than parking of the vehicle, e.g., during the traveling.

On the other hand, in the example 1, in the case of tilting up the rear column member 5, because of being structured so that the rear column member 5 can be always tilted up, as depicted by the imaginary line in FIG. 11, if the rear column member 5 moves up beyond the uppermost position of the tilt adjustable area, the probe 41 of the tilt-up detection sensor 40 abuts on the front side end support seat portion 22 of the rear column member 5, thereby switching over to the ON-state.

At this time, as shown in FIG. 13, it is constructed so that the traveling of the vehicle can be surely hindered.

Namely, as shown in FIG. 13, the control device 50, when the tilt-up detection sensor 40 receives the ON-signal, transmits a vehicle travel hindrance signal for hindering the traveling of the vehicle.

Upon receiving the vehicle travel hindrance signal, for example, the shift lever is locked so as not to shift from the parking range (P), the parking brake is locked not to be released, and the transmission is locked.

Note that there may be used either all or at least one of the signals exemplified as the vehicle travel hindrance signal.

This contrivance surely makes the vehicle unable to travel when tilted up.

Second Embodiment: Example 2

In this example 2, the lock device 30 is normally in the lock state, wherein the rear column member 5 can not be tilted up at all times.

As illustrated in FIG. 14, however, the lock device 50 can be switched over from the lock state to the non-lock state by use of a switch 51, wherein the rear column member 5 can be tilted up.

The switch 51 is a manual switch provided in an easy-to-manipulate position of the steering column or a dash panel. When the vehicle stops, a driver turns off the switch 51 before getting off the vehicle, and the tilt adjusting lever 12 is switched over, whereby the lock device 30 comes to the non-lock state. In this state, the tilt adjusting lever 12 can move to the tilt-up position.

Only in the case of confirming that the vehicle is in a stop/parking state even when the switch 51 is kept ON, however, the lock device 30 can be switched over from the lock state to the non-lock state.

Namely, as shown in FIG. 14, in such cases that the shift lever is kept in the parking range (P), the parking brake is locked or the vehicle speed is zero, vehicle stop/parking signals of the vehicle remaining in the stop/parking state are inputted as vehicle information to the control device 50.

Note that there may be used either all or at least one of the signals exemplified as the vehicle stop/parking signal.

The control device 50, as shown in FIG. 14, only when receiving from the switch 51 an ON signal for switching over the lock device 30 from the lock state to the non-lock state and also the vehicle stop/parking signal as the vehicle information, transmits to the lock device 30 the drive signal for switching over the lock device 30 from the lock state to the non-lock state.

The lock device, based on this drive signal, drives the solenoid 33 to make, as shown in FIG. 8, the lock pin 32 retreat from the lock elongate hole 31, thereby unlocking the rear column member 5.

Thus, only when confirming that the vehicle is in the stop/parking state, the rear column member 5 can be tilted up.

Further, a contrivance at this time, as shown in FIG. 14, is that the vehicle can be surely hindered from traveling.

Namely, as shown in FIG. 14, the control device 50, when the switch 51 receives the ON signal, transmits a vehicle travel hindrance signal for hindering the vehicle from traveling.

Note that the control device 50 in the present second embodiment also, as in the first embodiment, when the tilt-up detection sensor 40 receives the ON signal, may transmit the vehicle travel hindrance signal for hindering the vehicle from traveling.

Upon receiving this vehicle travel hindrance signal, for example, the shift lever is locked not to shift from the parking range (P), the parking brake is locked not to be released, and the transmission is locked.

Note that there may be used either all or at least one of the signals exemplified as the vehicle travel hindrance signal.

This contrivance surely makes the vehicle unable to travel when tilted up.

It is to be noted that the present invention is not limited to the embodiments discussed above and can be modified in a variety of forms. For example, the present invention, there being described the case where steering wheel is tilted up through the large angle in the tilt type, can be also applied to a case of its being tilted up through the large angle in a tilt/telescopic type.

As discussed above, according to the first invention, there is provided the detecting means for detecting that the rear column member moves beyond the on-driving tilt adjustable range, and hence, when the rear column member is titled up through the predetermined large angle exceeding the on-driving tilt adjustable range, for example, the speed-change shift is locked at the parking range (P), with the result that the vehicle becomes unable to travel.

Further, according to the preferred mode of the first invention, the control means is structured to transmit, upon receiving from the detecting means the detection signal indicating that the rear column member moves beyond the on-driving tilt adjustable range, the vehicle travel hindrance signal for hindering the vehicle from traveling, which surely makes the vehicle unable to travel when the rear column member is tilted up through the predetermined large angle exceeding the on-driving tilt adjustable range.

Moreover, according to the preferred mode of the first invention, the control means, based on the vehicle travel hindrance signal, transmits the signal for locking the shift lever not to shift from the parking range (P), thereby surely making the vehicle unable to travel when the rear column member is tilted up through the predetermined large angle exceeding the on-driving tilt adjustable range.

Further according to the second invention, there is provided the detecting means for detecting that the rear column member reaches the large-angle tilt position when the rear column member is tilted up through the predetermined large angle exceeding the on-driving tilt adjustable range, thereby surely making the vehicle unable to travel in a way that locks the speed-change shift at the parking range (P).

Still further, according to the third invention, there is provided the electric lock means for preventing, when locking, the tilt-up exceeding the on-driving tilt adjustable range in a way that holds the rear column member within the on-driving tilt adjustable range, and for allowing, when non-locking, the rear column member to be tilted up in excess of the on-driving tilt adjustable range, thereby making it possible to surely prevent the rear column member from being tilted up when other than parking of the vehicle, e.g., during the traveling, and to allow the rear column member to tilt up in excess of the on-driving tilt adjustable range.

Moreover, according to the preferred mode of the third invention, the control means is structured to, upon receiving the vehicle travel preparation/start signal for preparing to have the vehicle traveled or starting the traveling, switch over the lock means from the non-lock state to the lock state, whereby the rear column member can be surely prevented from being tilted up when other than parking of the vehicle, e.g., during the traveling.

Furthermore, according to another preferred mode of the third invention, the lock means can be switched over from the lock state to the non-lock state through the switch, and therefore the tilt-up exceeding the on-driving tilt adjustable range can be attained only by an intention of the driver, resulting in no possibility in which the large angle tilt-up happens carelessly irrespective of the intention of the driver.

According to yet another preferred mode of the third invention, the control means is structured so that the switch allows the lock means to switch over from the lock state to the non-lock state only when receiving the vehicle stop/parking signal of the vehicle that is in the stop/parking state, thereby enabling the rear column member to be tilted up in excess of the on-driving tilt adjustable range by switching over the switch to the non-lock state only when it can be confirmed that the vehicle is in the stop/parking state.

Further, according to the fourth invention, there is provided the tilt adjusting lever lock means for locking the tilt adjusting lever, and hence it is possible to prevent the steering wheel from being tilted up, for instance, during the traveling.

What is claimed is:

1. In a tilt adjustable type steering apparatus for a vehicle, constructed such that a rear column member is connected to a front column member fixed to a car body in a swayable manner between a position in an on-driving tilt adjustable range and a large angle tilt up position in excess of the on-driving tilt adjustable range by a predetermined angle, said rear column member being able to be releasably fixed at either of a position within said on-driving tilt adjustable range or said large angle tilt up position,
   an improvement comprising detecting means for detecting that said rear column member is tilted up through said predetermined angle exceeding the on-driving tilt adjustable range and producing a detection signal, and control means responsive to said detection signal for producing a vehicle travel hindrance signal for hindering the vehicle from traveling.

2. A tilt adjustable type steering apparatus for a vehicle according to claim 1, wherein said vehicle travel hindrance signal prevents a shift lever from shifting from a parking range.

3. In a tilt adjustable type steering apparatus for a vehicle, constructed such that a rear column member is connected to a front column member fixed to a car body in a swayable manner between an on-driving tilt adjustable range and a large angle tilt up position in excess of the on-driving tilt adjustable range by a predetermined angle, said rear column member being able to be releasably fixed at either of a position within said on-driving tilt adjustable range or said large angle tilt up position,
   an improvement comprising electric lock means having a locking state and a non-locking state, wherein in said locking state said electric lock means prevents a tilt up of said rear column member to a position exceeding the on-driving tilt adjustable range and holds said rear column member within the on-driving tilt adjustable range, and in said non-locking state allows said rear column member to be tilted up in excess of the on-driving tilt adjustable range.

4. A tilt adjustable type steering apparatus for a vehicle according to claim 3, wherein said lock means includes an electric actuator for switching between locking and non-locking states based on predetermined signals.

5. A tilt adjustable type steering apparatus for a vehicle according to claim 4, wherein said electric actuator is a solenoid.

6. A tilt adjustable type steering apparatus for a vehicle according to claim 3, further comprising means for switching said lock means from the non-locking state to the locking state in response to a vehicle travel preparation/start signal for preparing the vehicle for travel or for starting travel.

7. A tilt adjustable type steering apparatus for a vehicle according to claim 3, further comprising a switch for switching said lock means from the locking state to the non-locking state.

8. A tilt adjustable type steering apparatus for a vehicle according to claim 7, further comprising means for allowing said switch to switch said lock means from the locking state to the non-locking state only in response to a vehicle stop/parking signal when the vehicle is in a stop/parking state.

9. In a tilt adjustable type steering apparatus for a vehicle, constructed such that a rear column member is connected to a front column member fixed to a car body in a swayable manner between a position in an on-driving tilt adjustable range and a large angle tilt up position in excess of the on-driving tilt adjustable range by a predetermined angle, said rear column member being able to be releasably fixed at either of a position within said on-driving tilt adjustable range or said large angle tilt up position,
   an improvement comprising tilt adjusting lever lock means for locking a tilt adjusting lever to prevent the tilt adjusting lever from effecting tilting of the rear column member.

10. A tilt adjustable type steering apparatus for a vehicle according to claim 3, wherein said electric lock means is constructed to change between the locking state and the non-locking state by operation of a driver.

11. A tilt adjustable type steering apparatus for a vehicle according to any one of claims 1-10, wherein a fixed gear provided on one of said front column member and said rear column member is engaged with a movable gear provided on the other of said front column member and said rear column member when said rear column member is fixed to a tilt adjusted position, and said gears are disengaged from one another by swaying said movable gear when said rear column member is released from being fixed to the tilt adjusted position.

* * * * *